United States Patent [19]

Omata et al.

[11] 3,893,038

[45] July 1, 1975

[54] AUTOMATIC GAIN CONTROL CIRCUIT

[75] Inventors: Katsuyoshi Omata, Tokyo; Nobuaki Sato, Kanagawa-ken, both of Japan

[73] Assignee: Sony Corporation, Shinagawa-ku, Japan

[22] Filed: Aug. 26, 1974

[21] Appl. No.: 500,256

[30] Foreign Application Priority Data

Aug. 27, 1973 Japan .............................. 48-100433

[52] U.S. Cl. .......... 330/124 R; 179/1 G; 179/1 VL; 330/29; 330/30 R; 330/84; 330/141; 330/145

[51] Int. Cl. ............................ H03g 3/30; H03f 3/68

[58] Field of Search .......... 330/29, 30 R, 84, 124 R, 330/141, 145; 179/1 G, 1 VL

[56] References Cited

UNITED STATES PATENTS 3,509,289 4/1970 Briskey et al. .................. 330/133 X

*Primary Examiner*—James B. Mullins

*Attorney, Agent, or Firm*—Lewis H. Eslinger; Alvin Sinderbrand

[57] ABSTRACT

An automatic gain control circuit for a stereo amplifier having separate gain control means in each channel, each gain control means being actuated by control signal means from the same channel and from the other channel. The control means of the same channel has a relatively short attack time and a relatively long recovery time while the control means actuated by the other channel has a relatively long attack time and a recovery time that is substantially shorter than the recovery time of the control means actuated from the same channel as the gain control means.

10 Claims, 2 Drawing Figures

AUTOMATIC GAIN CONTROL CIRCUIT

BACKGROUND OF THE INVENTION

1. Field of the Invention

This invention relates to an automatic gain control circuit (hereinafter referred to as an AGC circuit) for use in multi-channel amplifier systems, and more particularly to an improved AGC circuit for use in stereophonic, or stereo, amplifier systems.

2. Description of the Prior Art

Stereophonic sound effects are basically determined by the angular relationship between the listener and a sound source or an apparent sound source. If a sound source produces equal response in a listener's left and right ears (assuming that the listener hears equally well with both ears), the listener will automatically interpret the sound as having originated directly from the front or from the rear of the listener's location. If the sound is louder in the listener's right ear, it will be interpreted as being located to the listener's right. Conversely, if it is louder in the listener's left ear, it will be interpreted as having come from the left.

In stereo reproduction of sound by laterally displaced speakers, a pattern of sound waves is produced similar to those that originate from the actual sound source. For example, stereophonically reproduced orchestra music of sufficiently good fidelity will give a listener the impression of being in the presence of an orchestra spread out in the way that the real orchestra was spread out across the recording stage. The apparent location of sound reproduced by stereo speakers can be changed by altering the amplitude of the signal used to supply power to the speakers. For example, if the volume control of the amplifier connected to the right-hand speaker is gradually turned down to zero, the sound will give the impression that it is originating from a source that is moving toward the left-hand speaker. This must be kept in mind when the gain of stereo amplifiers is automatically controlled to prevent overloading the speakers. It has been the practice heretofore to connect signals from both channels of a stereo system to a common gain control circuit so that the gain of both channels will be reduced simultaneously. This maintains the relative angular orientation of apparent sound sources, but it can have a deleterious effect in another way.

Orchestral music, for example, may require that certain instruments on one side of the orchestra play softly at the same time that other instruments, such as the timpani, produce sudden sounds of high intensity. Using the electrical signals in both of the channels to produce a common gain control signal will cause the gain of both channels to be decreased in response to the high amplitude transient signals of the timpani primarily in one channel. As a result, the low amplitude signals in the other channel may be so decreased in value as to be inaudible. This is especially true if the attack time of the automatic gain control (AGC) circuit is short and the recovery time is long.

Accordingly, it is one object of this invention to provide an improved AGC circuit for multi-channel operation to provide selective control of the gain of the channels so that each channel will respond quickly to its own transient signals but will also be partially controlled by slower changes in the signal level of a second channel.

Another object of this invention is to provide an AGC circuit for use in stereo tape apparatus.

A further object is to provide an AGC circuit for use in stereo apparatus in which the gain in one channel is controlled by an average control voltage generated in response to signals in both channels but does not respond to transient signals of the other channel.

SUMMARY OF THE INVENTION

In accordance with the present invention an AGC circuit for use in a stereo system is provided with gain control means in each channel the transmission gain of signals in that channel. A first control signal is derived from the same channel in which the gain control means is connected, and this first control signal is supplied to the gain control means in that channel through a first time constant circuit that has relatively good transient response. A second control signal is derived from the first channel and is connected to the gain control means in the other channel through a second time constant circuit having a longer attack time than that of the first time constant circuit so that the second gain control means will not be responsive to transient signals from the first channel but will respond to signals that change amplitude more slowly.

DESCRIPTION OF THE PREFERRED EMBODIMENTS

Figure 1:
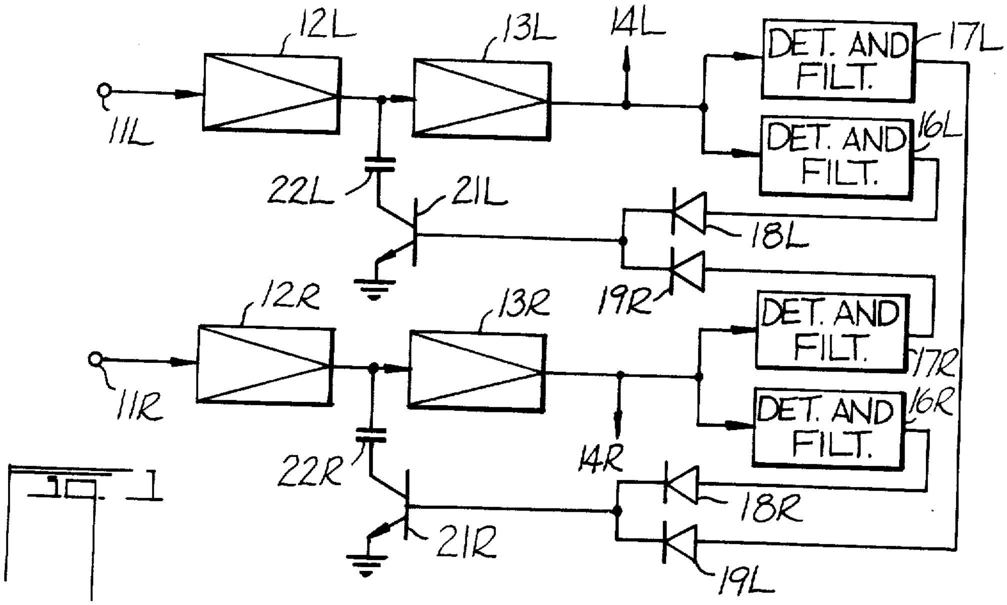
FIG. 1 is a block diagram of a basic stereo amplifier system incorporating gain control circuits according to the present invention.

FIG. 1 shows the basic components of an AGC circuit according to the present invention. The circuit comprises two similar parts, one of which carries signals referred to as Left signals and the other carries signals referred to as Right signals. These two sections of the circuit are identified in FIG. 1 by adding the letter L or R as appropriate to the reference numerals of the components.

Left signals are applied to an input terminal 11L which is connected to an amplifier 12L. The amplifier 12L is connected to another amplifier 13L that has an output terminal 14L that may be connected to further stages of amplification or to a transducer, such as a speaker (not shown). The output terminal 14L of the amplifier 13L is connected to two detector and filter circuits 16L and 17L to produce gain control signals derived from the information signal at the output terminal 14L. A diode 18L connects the output terminal of the detector and filter 16L to the base of a gain control transistor 21L. The emitter-collector output circuit of the transistor 21L is connected in series with a capacitor 22L between ground and the common circuit point between the amplifiers 12L and 13L.

The circuit in FIG. 1 includes a similar set of components for the right channel beginning with an input terminal 11R and an input amplifier 12R and including a second amplifier 13R with an output terminal 14R and two detector and filter circuits 16R and 17R. The output terminal of the detector and filter circuit 17R is connected by means of a diode 19R to the base of the gain control transistor 21L. In the same manner the output terminal of the detector and filter circuit 16R and the output terminal of the detector and filter circuit 17L are connected by diodes 18R and 19L, respectively, to the base of the transistor 21R that has its emitter-collector circuit connected in series with a capacitor 22R between ground and a common circuit point between the amplifiers 12R and 13R.

In the operation of this circuit in FIG. 1, the rectified and filtered signals applied by the circuits 16L and 17R to the transistor 21L control the emitter-collector impedance thereof. This impedance, together with the inherent output impedance of the amplifier 12L, comprises a voltage divider circuit so that the amplitude of the information signal that reaches the amplifier 13L is a fraction of the output signal of the amplifier 12:, and the value of this fraction, which is between zero and one, is inversely proportional to the amplitude of the control signals applied to the base of the transistor 21L. Control signals of high amplitude applied to the base of the transistor 21L will reduce the collector-emitter impedance of that transistor and thereby reduce the gain of the signals passing from the input terminal 11L to the output terminal 14L.

In accordance with this invention the attack time of the circuits 16L and 16R is made relatively small, under one second, and preferably under 0.1 second. The recovery time of the circuits 16L and 16R is chosen to be relatively large, at least approximately 10 seconds and preferably between 20 and 30 seconds. Thus, the circuits 16L and 16R are capable of passing relatively short transient signals but such transient signals only control the gain of the respective left and right channels.

The circuits 17L and 17R have charging time constants which are larger than the circuits 16L and 16R. Thus, the attack time of the circuits 17L and 17R may be approximately 5 seconds so as to be substantially slower than the attack time of the circuits 16L and 16R. However, the discharging time constant in the circuits 17L and 17R is made shorter than the discharging time constant of the circuits 16L and 16R. For example, the discharging time constant of the circuits 17L and 17R is such that the recovery time of these circuits is approximately 5 seconds, which is substantially the same as the attack time.

According to the present invention, when a transient signal of relatively high amplitude is applied only, or primarily, to one of the channels, for example, by being applied to the input terminal 11L, the AGC function of that channel begins to operate in less than 0.1 second by way of the detector and filter circuit 16L. On the other hand, the attack time of the detector and filter circuit 17R used to affect the gain of signals applied to the input terminal 11L in response to the amplitude of signals applied to the terminal 11R is so long that the gain control transistor 21L will not be affected by transient signals applied to the terminal 11R. During normal operation, the AGC functions of both channels are controlled by the average voltage, which is the control from each of the respective channels and the control voltage from the other channel mixed together.

The purpose of the diodes 18L, 18R, 19L, and 19R is to permit signals from the circuits 16L, 16R, 17L, and 17R to be transmitted only to the respective gain control transistors 21L and 21R without feeding back to affect the operation of any of the other detector and filter circuits.

Figure 2:
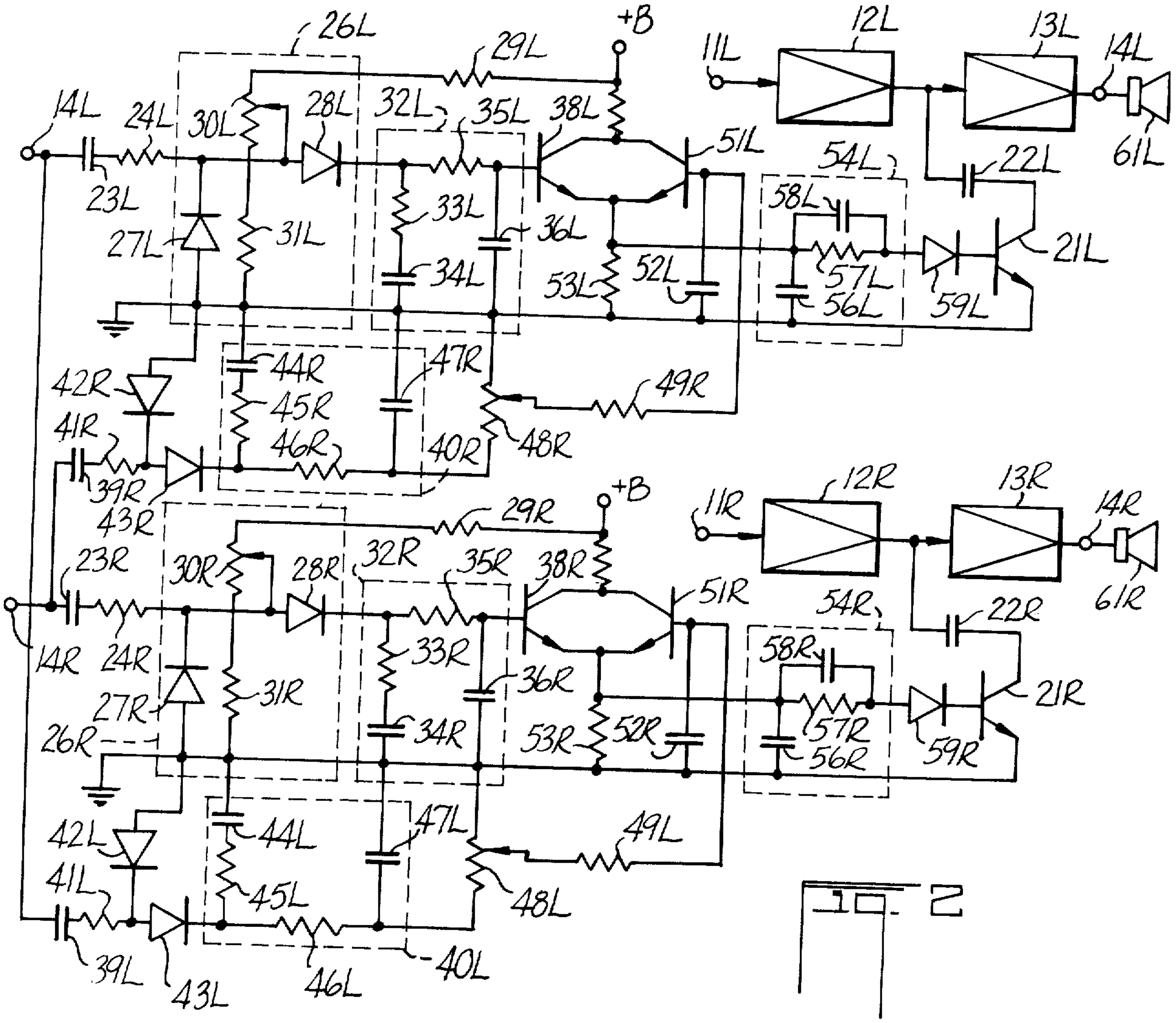
FIG. 2 is a schematic diagram of one embodiment of gain control circuits used in the basic circuit in FIG. 1.

FIG. 2 shows the control circuits of FIG. 1 in greater detail. Since these control circuits are identical between the left and right channels, only the control circuit for the left channel will be described in detail. As may be seen, it has an input terminal 14L, which is the same as the output terminal 14L of the amplifier 13L. The connection joining these two terminals that have the same reference numeral is omitted for the sake of clarity. The terminal 14L is connected to an input circuit that includes a capacitor 23L in series with a resistor 24L to supply signals to a bi-directional rectifier circuit 26L. This circuit includes a diode 27L connected across its input terminals and a second diode 28L connected in series between the input and the output of the bi-directional rectifier circuit. The diode 28L is biased by a voltage divider comprising three resistors 29L-31L of which the resistor 30L is a potentiometer that has its arm connected to the anode of the diode 28L.

Following the rectifier circuit 26L is a smoothing circuit 32L that includes a resistor 33L connected in series with a capacitor 34L across its input terminals, a series-connected resistor 35L between its input and output terminals, and an output capacitor 36L across its output terminals. The base of a transistor 38L is connected to the output terminal of the filter circuit 32L.

The other input terminal of the control circuit is the terminal 14R which is connected by a capacitor 39R and a resistor 41R to another bi-directional rectifier circuit comprising a diode 42R and a second diode 43R. The cathode of the latter diode is connected to a smoothing filter circuit 40R that has the same basic configuration as the smoothing filter circuit 32L. The circuit 40R includes a capacitor 44R connected in series with a resistor 45R across the input terminals of the filter, a series-connected resistor 46R, and a capacitor 47R connected across the output terminals of the filter. Also connected across the output terminals of the filter is a poteniometer 48R, the arm of which is connected by way of a resistor 49R to the base of a transistor 51R. A capacitor 52R is connected between the base of the transistor 51R and ground. The emitter-collector circuits of the transistors 38L and 51R are connected directly in parallel, and these transistors are connected in an emitter-follower circuit having an emitter load 53L. The emitters of the transistors 38L and 51R are connected to a further filter circuit 54L comprising a capacitor 56L connected across its input terminals and an RC circuit that includes a resistor 57L in parallel with a capacitor 58L in series between the input and output terminals of the filter 54L. A diode 59L connects the output terminal of the filter 54L to the base of the gain control means transistor 21L. This transistor is connected to the amplifiers 12L and 13L in the manner shown in FIG. 1. A speaker 61L is connected to the output terminal 14L.

In accordance with the invention, the values of the circuit components in the smoothing filter 32L are selected to provide a relatively short attack time, so that the circuit can respond to transient signals, and a relatively long recovery time. In contrast, the component values of the smoothing filter 40R are chosen to have a substantially longer attack time than the smoothing filter 32L but a shorter recovery time.

The transistors 38L and 51R form a mixing circuit that allows signals to pass from each of the smoothing filter circuits 32L and 40R to the filter circuit 54L but not to pass from the circuit 32L to the circuit 40R or vice versa. The combined signal from the transistors 38L and 51R is further filtered in the filter 54L and is applied as a single-polarity signal to the gain control transistor 21L.

What is claimed is:

1. An automatic gain control circuit for a multichannel amplifying system, said gain control circuit comprising:

A. first and second gain control means connected to first and second ones of said channels, respectively;

B. first control signal means connected to said first channel to be energized by an information signal therein to generate a first control signal and connected to said first gain control means to form a first control circuit comprising a first time constant circuit having a first time constant value to control the gain of said information signal in said first channel;

C. second control means connected to said first channel to be energized by an information signal therein and connected to said second gain control means to form a second control circuit comprising a second time constant circuit having a different time constant value than said first time constant circuit to control the gain of an information signal in said second channel;

D. third control means connected to said second channel to generate a third control signal in response to an information signal in said second channel, said third control means being connected to said second gain control means to form a third gain control circuit comprising a third time constant circuit having a different time constant value than said second time constant circuit to control the gain of said information signal in said second channel; and E. fourth control means connected to said second channel to be energized by an information signal in said second channel and connected to said first gain control means to form a fourth gain control circuit comprising a fourth time constant circuit having a different time constant value than said third time constant circuit to control the gain of an information signal in said first channel.

2. The automatic gain control circuit of claim 1 in which said time constant value of said first and third time constant circuits are substantially equal to each other and said time constant value of said second and fourth time constant circuits are substantially equal to each other.

3. The automatic gain control circuit of claim 1 in which said time constant value of said first and third time constant circuits are responsive to substantially shorter transients than the time constant value of said second and fourth time constant circuits.

4. The automatic gain control circuit of claim 3 in which said time constant value of said first and third time constant circuits has an attack time of less than approximately one second and a recovery time of greater than approximately ten seconds.

5. The automatic gain control circuit of claim 4 in which said time constant value of said second and fourth time constant circuits has an attack time of greater than one second and less than ten seconds and a recovery time of greater than one second and less than ten seconds.

6. The automatic gain control circuit of claim 4 in which the time constant value of said first and third time constant circuits has an attack time of approximately 0.1 second and a recovery time of at least approximately 20 seconds.

7. The automatic gain control circuit of claim 6 in which the time constant value of said second and fourth time constant circuits has an attack time of approximately 5 seconds and a recovery time of approximately 5 seconds.

8. The automatic gain control circuit of claim 1 in which said first and second channels comprise first and second cascade-connected amplifier stages, respectively, and said first and second gain control means comprise first and second variable impedance means connected to output circuits of said first cascade-connected amplifier in each of said first and second channels, respectively, to form therewith a voltage divider circuit to control the relative amplitude of signals supplied by said first cascade-connected amplifier to said second cascade-connected amplifier in the respective channel.

9. The automatic gain control circuit of claim 1 comprising uni-directional signal conductive means connected between said first and fourth control means and said first gain control means to actuate said first gain control means.

10. The automatic gain control circuit of claim 9 comprising uni-directionally signal conducting means connecting said second and third means to said second gain control means to control the operation thereof.

* * * * *